US005774967A

United States Patent [19]

Greve et al.

[11] Patent Number: 5,774,967

[45] Date of Patent: Jul. 7, 1998

[54] HAND HELD PIVOT ROD INSERTION TOOL

[75] Inventors: Christopher G. Greve, Covington; Paul L. Horton, Metairie; Ronald M. O'Connor, Jefferson, all of La.

[73] Assignee: The Laitram Corporation, Harahan, La.

[21] Appl. No.: 924,506

[22] Filed: Sep. 5, 1997

Related U.S. Application Data

[63] Continuation of Ser. No. 465,453, Jun. 5, 1995, abandoned.

[51] Int. Cl.[6] ........ B23P 19/02

[52] U.S. Cl. ........ 29/235; 29/278

[58] Field of Search ........ 29/278, 280, 234, 29/235

[56] References Cited

U.S. PATENT DOCUMENTS

| | | | |
|---|---|---|---|
| 651,267 | 6/1900 | Pickett | 29/278 X |
| 653,775 | 7/1900 | Marshall | 29/278 X |
| 714,989 | 12/1902 | Worthington | 29/278 X |
| 965,054 | 7/1910 | Weekes | 29/278 X |
| 2,216,872 | 10/1940 | Baxendale . | |
| 2,355,866 | 8/1944 | Ingalls . | |
| 2,387,408 | 10/1945 | Pertuit . | |
| 2,969,243 | 1/1961 | Drazick | 29/278 X |
| 3,576,057 | 4/1971 | Hay . | |
| 3,967,831 | 7/1976 | Chang et al. . | |
| 4,341,002 | 7/1982 | Diba | 29/280 X |
| 4,512,071 | 4/1985 | Fieberg et al. | 29/278 |
| 4,991,278 | 2/1991 | Hendrix | 29/278 |
| 5,332,084 | 7/1994 | Greve . | |

*Primary Examiner*—Joseph M. Gorski
*Attorney, Agent, or Firm*—Laurence R. Brown

[57] ABSTRACT

A hand held plastic rod gripping tool 25 is especially adapted for forcefully pushing thin cylindrical plastic rods into a resident pivot joint site between two modular links of a conveyor belt. Plastic pivot rods are difficult to insert manually because they are thin, and easily flexed, making them hard to grasp frictionally in the fingers at a stiff short section for forceful axial insertion. Also some conveyor modules require the rods or the modules to be distorted for snapping in over a barrier ridge thus requiring more force for initial entry. The tool 25 has a cylindrical knurled 26 hand grip body, of a diameter that permits a firm grasp, through which extends an axial passageway, typically a slot 27, for entry of the rod. A manually movable gripper assembly 45 is generally laterally movable to frictionally contact a rod 10 held within the tool body. Within an interior channel 49 at an acute converging angle 50 toward a rod 10 the gripper 45 is spring biassed 46 to move toward the rod surface. The angular channel 49, in which the gripper rides, serves to strengthen the grip as the rod is pushed against an opposing force. A one-way clutching action permits a gripped rod alternately to be forcefully pushed into place and to be freely fed through the grip. The gripper has a set of shaped metal plates, each with a notch 50 that partially surrounds the cylindrical rod 10 holding it nested in a mating groove 40 within the tool body. Knife-like edges 51 along notches 50 bite into plastic for a secure grip. A forward end of the tool is flanged 28 to provide at its outer end a planar pushing member 60 for contact with the rod end after it leaves the tool.

15 Claims, 3 Drawing Sheets

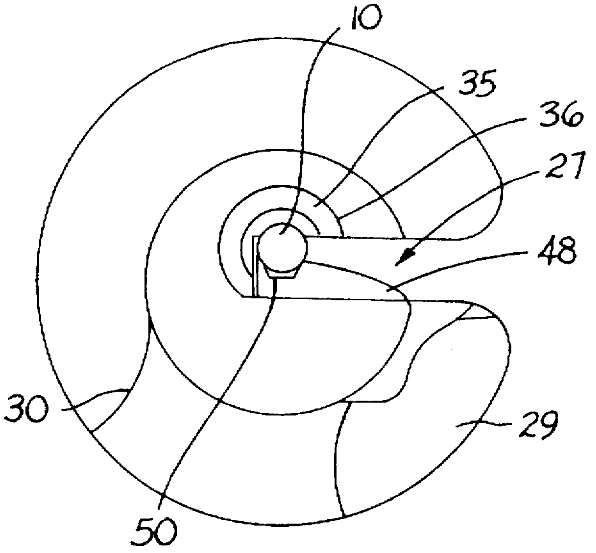
FIG. 6
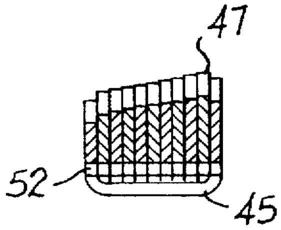
FIG. 7
FIG. 8
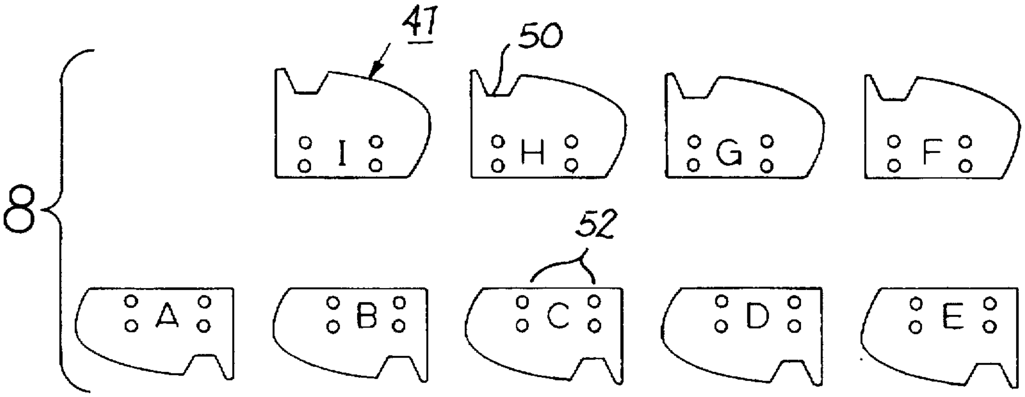
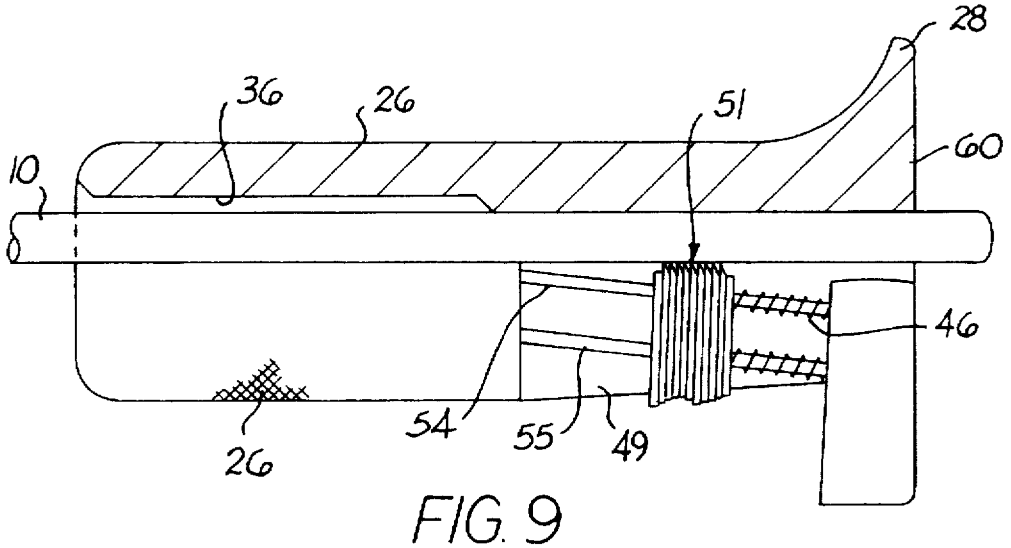
FIG. 9

HAND HELD PIVOT ROD INSERTION TOOL

This application is a continuation of application Ser. No. 08/465,453, filed Jun. 5, 1995, now abandoned.

TECHNICAL FIELD

This invention relates to insertion of plastic pivot rods into place in modular conveyor belts, and more particularly it relates to a hand held tool for clamping a thin plastic pivot rod and forcing it axially into place in a resident site.

BACKGROUND ART

In the modular conveyor arts it is common to use slender plastic pivot rods, typically about one-quarter inch in diameter and cylindrical in shape. In the modular plastic conveyor belt arts there are modular configurations for retaining the pivot rods axially in place by barrier strips that require forceful disfiguration of either the pivot rods or the belt module, thus making it difficult to enter the pivot rods manually during belt manufacture or repair.

A significant problem imposed in insertion of thin plastic pivot rods, typically about one-quarter inch in diameter, are their flexibility. Thus they are readily bent by excessive or misdirected axial forces. Conversely the rods must be kept stiff and straight for forcible entry as they are pushed axially into a pivot rod site.

A further problem encountered is in the manual manipulation of the slick substantially frictionless plastic rod surfaces of small diameters. Thus small diameter rods are not easily or comfortably grasped, so that the manual exertion of axial forces required in some belt configurations to insert the pivot rods is so high that the fingers are soon fatigued, even if it is possible to successfully manually insert the pivot rods. The grasping forces are considerable because of the small contact surfaces of small diameter rods and the smooth surfaces of plastic rods.

Thus, it is a general objective of this invention to provide an appropriate comfortable and effective tool for manual feeding and insertion of a plastic rod into a resident site when encountering a substantial force that must be overcome.

It is a more specific objective of this invention to facilitate the assembly and repair of modular plastic conveyor belts with manually manipulated mechanisms for inserting cylindrical plastic pivot rods into nested pivot joint sites between adjacent modular links.

Further objects, features and advantages of the invention will be found throughout the following description, drawings and claims.

DISCLOSURE OF THE INVENTION

A hand held tool is especially adapted for forcefully pushing thin cylindrical plastic rods into a resident site such as entry of plastic pivot rods in a modular conveyor belt pivot joint site. In general, the pivot rods are inserted in closely fitting holes disposed in interdigitated link ends of joined modular links, which may be misaligned enough to introduce significant frictional force to be overcome for entry of the rods. Plastic pivot rods are difficult to insert manually because they are thin smooth, and easily flexed, making them hard to grasp by the fingers. Also they are hard to direct without flexing and thus must be grasped near the insertion site so that a stiff short section of the rod is being forcefully inserted inch by inch into place. Furthermore, in some conveyor modules the rods or the modules need to be distorted for snapping into place over a barrier retainer ridge or the like, thus requiring a significantly greater amount of directed rod entry force.

The tool of this invention has a cylindrical hand grip body of a diameter much larger than the rod with a knurled or otherwise roughened surface to permit a firm and comfortable grasp with one hand. An axial passageway, typically a slot, passes through the cylindrical grip body for entry of the rod from either end or the side. A manually positionable rod gripper member is mounted in the grip body to grasp the rod and prevent axial movement as the rod is forced into a resident site.

In a preferred embodiment the gripper member is mounted alongside the rod for generally axial movement between a rod gripping and a rod release position with the thumb. This gripper member moves in an interior channel in the cylindrical grip body and is disposed at an acute converging angle toward a rod axially disposed in the passageway. This thumb-releasable gripper is spring biassed to move toward the rod and thus normally clamps the rod in place. The angular channel serves to strengthen the grasp by moving the gripping member more forcefully into the rod when it is pushed against an opposing force for entry into a resident site.

Furthermore the gripper is basically operable as a clutch with a one-way clamping action that permits the rod to be simply advanced inch-by-inch while it is being pushed into place. Thus, a short operative length of the rod may be extended between the tool and the entry point that is stiff and avoids bending with the applied axial force.

The preferred frictional gripper member embodiment is formed from an assembly having a contiguous set of shaped metal plates, each with a notch that surrounds part of the cylindrical rod on one side as it is nested in a groove along the passageway through the cylindrical grip body. Sharpened, knife-like edges in the notches dig into plastic for a secure grip. In a relaxed non-gripping condition, the plates are loosely assembled for a limited degree of relative movement within a caging bracket retaining member to permit a bit of relative axial movement and pivoting of individual plates. Thus a slight pivoting action about the sharpened edges as the plates are wedged into gripping position and released therefrom prevents the tendency to shave off a surface layer of a plastic rod.

At a forward end of the hand grip is a flange to provide at its outer end a planar surface suitable for pushing the end of a rod after release from the tool. This flange defines thumb and finger rest surfaces to permit comfortable manual pushing against the flange. Thus the grip serves as a pushing member for the remaining trailing end section of the rod when it is too short to grip. The gripping end of the flange has smoothly contoured thumb and finger rests for comfort. The outer diameter of the grip is chosen to make the tool comfortable in the hand and capable of manually relaying significant axial forces for feeding the rod inch by inch into place. A typical grip body diameter is one and a quarter inch.

An inner passageway through the grip body will accommodate a headed rod with a trailing head flange for feeding part way through the grip. An axial slot along the grip body permits the headed rod to be laterally moved out of the axial passageway as the trailing head end of the rod is about half way through the grip body, typically about four inches long.

Thus the grip assembly comprehensively adapts to a reasonable range of rod characteristics, and is ideally suited for manually inserting plastic pivot rods into place in a modular conveyor belt.

Other features, advantages and objectives of the invention will be found throughout the following description, claims and drawings.

BRIEF DESCRIPTION OF THE DRAWINGS

In the accompanying drawings, wherein like reference characters in the several views indicate similar features for ready comparison:

FIG. 6 is an end view of the FIG. 5 tool looking toward the right, FIG. 7 is a side view, partly in section, of a rod gripper member having a set of contiguous plates caged in a bracket, FIGS. 8A to 8I are respective plan views of the gripper plates that make up a typical set of gripper plates in a preferred embodiment of this invention, FIG. 9 is a top view, partly in section looking downward into the grip body of FIG. 5.

THE PREFERRED EMBODIMENTS

Figure 1:
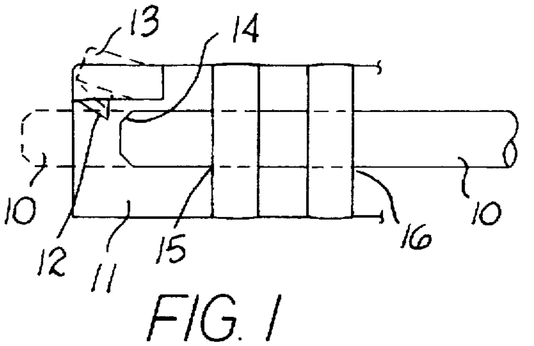
FIGS. 1 to 4 are representative fragmental sketches of modular conveyor belt link configurations adapted to receive plastic pivot rods in resident pivot sites after elastic deformation of either the pivot rods, the accompanying module like body, or both, so that considerable axial force is required for entry of the pivot rods into a resident pivot site.

Plastic rods 10, such as shown in a resident pivot position in the modular conveyor belt link 11 of FIG. 1, are inserted from one end such as shown by the phantom view of the rod 10 to reside within link apertures 15, 16 located in the interdigitatable module link ends. In this embodiment, it is shown by phantom view that the link 11 has an elastically flexible tab 13 with a stop member 12 that snaps into place after entry of the pivot rod 10 for retaining the end 14 of rod 10 in place within the link 11.

It is seen therefore, that thin plastic rods 10, typically less than a quarter inch in diameter, must be forced into the resident position within link 11 by deforming the tab 13. Also it is noted that interdigitated link ends from two adjacent modular links 11 into which the pivot rods 10 are to be nested are easily misaligned as the pivot rods 10 are being inserted. This provides additional obstructions and frictional counterforces that must be overcome for entry of a pivot rod 10 into its resident site. Thus enough axial entry force is required that it is difficult and uncomfortable to grasp a smooth, slippery, plastic rod surface of small diameter by the fingers for forced axial entry into a resident pivot position in a conveyor belt. Furthermore if the rod is not grasped and pushed within a short distance from the entryway of the link 11, it is slender and flexible and would tend to bend and divert the force away from axial movement required for entry of the rod. Thus, it is more successful to push the rod 10 into its resident site inch-by-inch by grasping the rod at a position near the entryway to maintain a stiff axial entry posture.

Figure 2:
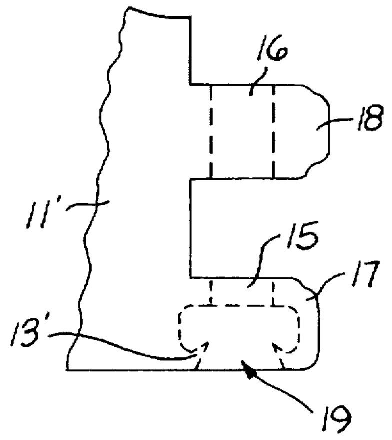

As seen from the different link embodiment 11' of FIG. 2, the entryway 19 is adapted for snap-in friction fit of the head of a headed plastic pivot rod that resides in the cylindrical passages 15, 16 in the link ends 17 and 18 respectively. This requires elastic deformation of the lip tabs 13'. Also this illustrates the necessity for providing in an appropriate comprehensive tool the ability to process headed pivot rods.

Figure 3:
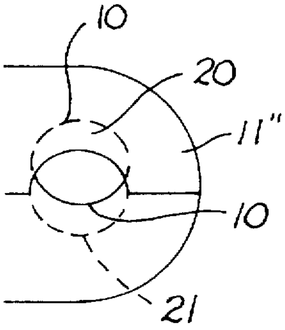
Figure 4:
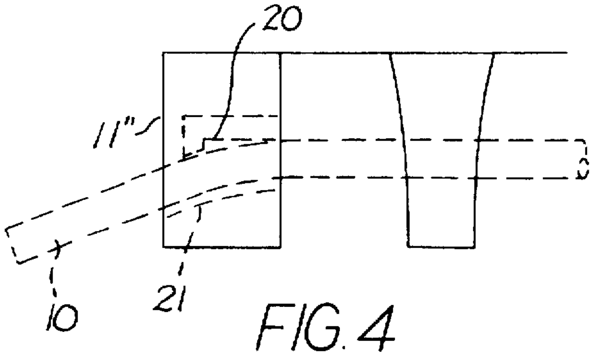

The still further link 11" embodiment of FIGS. 3 and 4, provides a less flexible tab 20 which occludes the rod 10 entry into the resident pivot site, and thus causes the rod 10 to bend as it enters the link 11". It is evident that a forceful entry is required that could be significantly aided for manual entry by the hand grip tool afforded by this invention.

Figure 5:
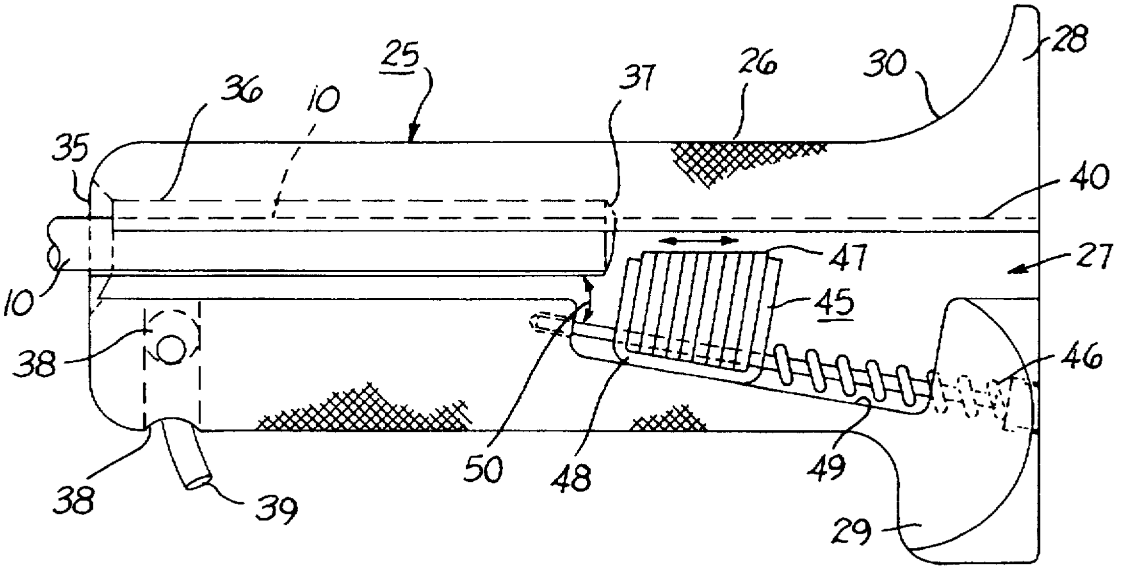
FIG. 5 is a side view of a preferred hand grip tool embodiment afforded by this invention, with a pivot rod being axially entered toward a gripping position within the tool body.

The side view of the generally cylindrical hand grip tool 25 of FIGS. 5 and 6 is partially hatched at 26 to show a knurled, frictional finish on the outer cylindrical part of the tool surface having a diameter comfortable to fit the hand, such as one and a quarter inch. Typically the tool body is acetal, and the overall length is about four and one-eighth inch. A longitudinal slot 27 is positioned to extend off center, as shown above the cylindrical axis. The slot width is greater than the diameter of rods to be processed so that they may be entered either laterally from the side or axially from either end.

At the rightmost head or flange end, the flange 28 has a thumb notch 29 and a finger groove 30 for fitting with a closed fist that surrounds the cylindrical body of the grip tool 25. Thus, it is comfortable to grip the tool in one hand, and to urge the tool axially toward the head end. The thumb notch 29 and finger groove 30 may be made for either the left or right hand. This embodiment illustrates a right handed tool.

In the trailing end is a conical guideway 35 for entry of a rod 10, with or without a trailing head. An inner bore 36 is large enough in diameter to admit a trailing head, which can be removed laterally out of slot 27 when the head reaches the end of the bore 37. The arched hole 38 accommodates a carrying cord 39, or chain so that the tool may be attached about a belt, for example.

A cylindrical rod nesting groove 40 retains the abutted pivot rod 10 in the head end of the tool when the gripper rack assembly 45, urged to the left against the rod by two springs 46 to clamp the rod 10 in place in the groove 40. The angle of the blades 47 in the set caged within the bracket 48 is such that the set of loosely packed blades will impede the rod 10 against rearward movement. When force is applied toward the flange head end, the loosely packed blades 47 (FIG. 7) individually pivot toward the slot 27, biting more deeply into the rod 10 and locking it against rearward movement. However, the blade assembly generally acts as a one-way clutch to permit the rod 10 to slide freely forward toward the flange end, so that the rod may be fed inch-by-inch, or in greater increments, out of the tool for entry into a resident site entryway. Furthermore, as the individual loosely packed blades 47 move relative to each other in the rack assembly 45, they tend to dislodge any dirt or rod shavings that could foul the tool. The bite of the blades 47 is deep enough to allow the tool to be used to remove rods as well.

The channel 49, alongside passageway slot 27, is disposed at the acute angle 50 with the nested rod 10 to permit movement of the gripper rack 45 back and forth generally axially as indicated by the two headed arrow. Thus, as the rack 45 moves toward the head flange end, the rod is released and is conversely gripped tighter as the rack 45 moves backward, as it tends to do when an axial force is exerted toward the head flange end in inserting a rod 10 into a conveyor belt module, for example. The plates 45 are disposed to have a parallel surface for confronting the rod 10. The viewed edge of the rack 48 and blades 47 extends beyond the cylindrical body of the tool 25, thereby serving as a thumb operated gripper member trigger for pushing back against springs 46 to release the rod 10 or to permit insertion of the rod 10 from the side through slot 27. The rod is also easily inserted by drawing the tool 25 backwards along the rod as it is loaded from the side.

As seen in FIGS. 8A to 8I, each of the separate blades 47 is of a different shape and size to fit into the angled channel 49, with the largest blades (I) toward the flanged head end. The truncated V-shaped notches 50 partly encompass the rod 10 and have sharpened sides (simulated at 51 in FIG. 9) fashioned as knives that dig into the plastic material to prevent axial slipping. The angle of engagement of the V-shaped notches 50 with the rod 10 further increases the bite of the sharpened sides into the rod. A set of apertures 52 through the blade mate with mounting rods 54, 55 affixed within the body to reside in the channel 49. The notched side of the blades 47 is tapered to urge rods 10 inserted from the side of the tool 25 into position when the tool is drawn back. Typically nine blades are assembled in the caging outer bracket 45.

In operation therefore, the rod 10 is grasped by the gripper member assembly blades 51 with a small stiff section extending outwardly from flange face 60. Then by manual grasping of the tool cylindrical body with the thumb and finger pushing against flange 28 the rod may be forcefully entered into a resident site, inch by inch as the rod 10 is freely pushed forward a bit at a time by the one way clutching action of the gripping assembly. There is thus no finger fatigue or slipping of the fingers relative to the rod 10. The ease of use of the embodiment of FIGS. 5, 6 and 9 with the self aligning spring 46 loaded gripper rack 45 and set blades 47 is evident.

Figure 10:
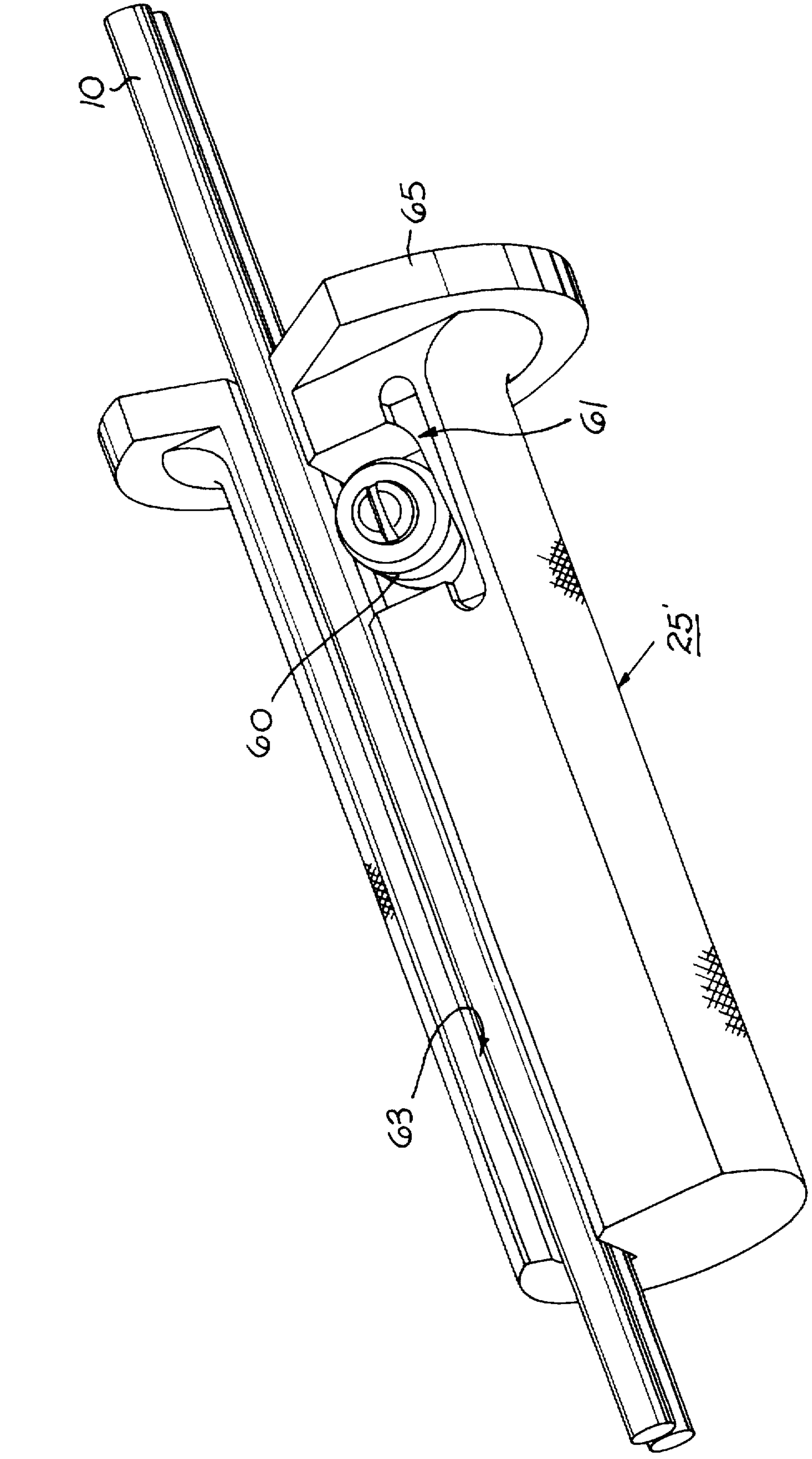
FIG. 10 is a perspective sketch of a further manually operated rod gripping tool embodiment afforded by the invention.

In FIG. 10, an alternative tool 25' embodiment of the invention has a pair of knurled, independently rotatable gripper wheels 60, 62 slidable on a laterally movable platform, which is wedged by wedge member 61 in a direction urging each gripper wheel 60, 62 against a respective rod 10, 10' aligned in the slotted passageway 63. This requires manual seating of the knurled lower wheel 60 against the rod for each bite as the rod is extended inch-by-inch away from flange 65 to enter a resident site. A one-way clutching rotational mechanism for the lower gripper wheel 60 will permit the rod to be moved in an inserting direction out of the tool while maintaining the forceful grip for inserting the rod into a resident site. The upper gripper wheel 62 is used to retain a second rod 10' in a position to be slipped readily into position against the lower gripper wheel 60 once the lower rod 10 has been inserted into a resident site. To facilitate the side loading of the rods 10 into the passageway 63, the edges of the wheels 60, 62 can be chamfered. The knurling of each wheel 60, 62 can be arranged in a helical pattern, such as a left-handed helix in the version shown in FIG. 10, to urge the rods 10, 10' down into the passageway 63 and to counteract any tendency of the rods 10, 10' to work their way out of disengagement with the wheels under the force of insertion into a resident site.

It is therefore seen that this invention has advanced the state of the art by providing a new and useful hand held tool for feeding a plastic rod forcefully into place in a resident site such as the pivot joint between two adjacent modular links of a conveyor belt. Accordingly those novel features exhibiting the spirit and nature of this invention are defined with particularity in the following claims.

We claim:

1. A hand held tool for moving a thin flexible cylindrically shaped plastic rod forcefully into a resident nested position in a receptacle device, comprising in combination:

a generally cylindrical hand held grip body of substantially greater diameter than that of said rod, a longitudinal passageway extending axially completely through said grip body for selectively receiving said rod axially within said grip body, and manually releasable rod gripping means comprising a rack of movably disposed side-by-side blades nested within said grip body to move laterally in a path toward and away from said rod received within said passageway to contact an outer cylindrical surface of said rod and prevent movement of said rod through said passageway in at least one axial direction such that an axial manual force is permitted to be relayed from said grip body to said rod for forceful movement of said rod in an axial direction that is opposite to said one axial direction.

2. The tool of claim 1 of particular length wherein said longitudinal passageway comprises a slot extending along said length of said tool.

3. The tool of claim 1 having a cylindrical groove along said longitudinal passageway for nesting said rod on a side wall of said passageway.

4. The tool of claim 1 wherein said gripping means further comprises a thumb grip member laterally movable into said rod, and said blades further comprise gripping teeth positioned to partially surround said rod and hold it in position when said blades in said rack are frictionally engaging said rod.

5. A hand held tool for moving a thin flexible cylindrically shaped plastic rod forcefully into a resident nested position in a receptacle device, comprising in combination: a generally cylindrical hand held grip body of substantially greater diameter than that of said rod, a longitudinal passageway extending axially completely through said grip body for selectively receiving said rod axially within said grip body, and manually releasable rod gripping means nested within said grip body to move laterally in a path toward and away from said rod received within said passageway to contact an outer cylindrical surface of said rod and prevent movement of said rod through said passageway in at least one axial direction such that an axial manual force is permitted to be relayed from said grip body to said rod for forceful movement of said rod in an axial direction that is opposite to said one axial direction, said rod gripping means being mounted within a channel within said grip body disposed at an acute angle to said longitudinal passageway said tool further comprising mounting means for moving said rod gripping means in said channel at said acute angle including a thumb actuated member for releasing said gripping means-from said rod by movement of a thumb of a hand about said grip, such that general longitudinal movement of said rod within said passageway is permitted as said rod gripping means moves laterally out of frictional contact with said cylindrical plastic rod outer surface.

6. The tool of claim 5 wherein said rod gripping means further comprises, a laminar set of gripping teeth mounted in a loosely packed stack, and mounting means for moving said gripping teeth set back and forth in said channel a distance respectively permitting entry of said rod into said passageway and into frictional locking engagement with an outer surface of said rod thereby holding said rod immovably within said grip body.

7. The tool of claim 6 further comprising individual laminar gripping teeth in said set having indentations for encompassing and mating with a surface length of said rod in gripping contact.

8. The tool of claim 7 further comprising sharpened contact edges on said laminar indentations for biting into said plastic rod.

9. The tool of claim 7 further comprising successive laminations in said set having different widths to conform with said acute angle of said channel and to dispose a two-dimensional gripping surface extending substantially parallel to said grip cylinder axis.

10. The tool of claim 6 further comprising a flange about said cylindrical grip body forming a forward facing finger rest end piece extending outwardly from said grip body cylinder.

11. The tool of claim 10 wherein said channel converges toward a rod inserted in said grip passageway rearwardly from said flange, thereby to increase gripping friction upon said rod as said grip is moved forcefully in a forward position by finger pressure upon said flange.

12. The tool of claim 2 wherein said gripping means further comprises a member extending through said surface of said grip for axial movement by thumb contact to one extremity for inserting a rod, and spring biasing means for moving said gripping means toward an opposite extremity for contact with said rod.

13. The tool of claim 2 wherein said receptacle device comprises a modular conveyor belt of modular units coupled together by plastic pivot rods with said rod gripping means in engagement with a pivot rod for said modular conveyor belt to prevent longitudinal movement of said pivot rod in said grip body as said pivot rod is forced into a nested position between end-to-end coupled belt modules thereby pivotably coupling together two end-to-end coupled conveyor belt modular units.

14. A hand held tool for moving a thin flexible cylindrically shaped plastic rod forcefully into a resident nested position in a receptacle device, comprising in combination: a generally cylindrical hand held grip body of substantially greater diameter than that of said rod, a longitudinal passageway extending axially completely through said grip body for selectively receiving said rod axially within said grip body, and manually releasable rod gripping means nested within said grip body to move laterally in a path toward and away from said rod received within said passageway to contact an outer cylindrical surface of said rod and prevent movement of said rod through said passageway in at least one axial direction such that an axial manual force is permitted to be relayed from said grip body to said rod for forceful movement of said rod in an axial direction that is opposite to said one axial direction, wherein said rod gripping means comprises a knurled wheel, and a wedging member urges said knurled wheel into frictional contact with said rod.

15. Apparatus for inserting cylindrical plastic pivot rods into pivot sites between successive modules of a modular conveyor belt comprising in combination: hand grasped gripping means for enveloping a pivot rod with a substantially cylindrical internal retention cavity extending through the gripping means, mechanical clamping means comprising a knurled wheel and a wedging member for urging the knurled wheel into frictional contact with a pivot rod nested in said cavity for clamping said pivot rod in a manually selected axial relationship within said gripping means to extend a portion of said hand grasped means with said gripping means with one hand, and manually operable release means for releasing said clamping means when engaging a pivot rod being located within said hand grip for movement in response to finger pressure.

* * * * *